United States Patent
Mazzucchi et al.

(10) Patent No.: US 8,631,916 B2
(45) Date of Patent: Jan. 21, 2014

(54) APPARATUS FOR THE PARKING LOCK OF AN AGRICULTURAL VEHICLE

(75) Inventors: Franco Mazzucchi, Ciano di Zocca (IT); Eugenio Sereni, Modena (IT); Francesco Roli, Vignola (IT)

(73) Assignee: CNH America LLC, New Holland, PA (US)

( * ) Notice: Subject to any disclaimer, the term of this patent is extended or adjusted under 35 U.S.C. 154(b) by 634 days.

(21) Appl. No.: 12/616,658

(22) Filed: Nov. 11, 2009

(65) Prior Publication Data

US 2010/0116605 A1  May 13, 2010

(30) Foreign Application Priority Data

Nov. 11, 2008 (IT) .............................. BO2008A0677

(51) Int. Cl.
*F16D 69/00* (2006.01)
*B60T 1/00* (2006.01)

(52) U.S. Cl.
USPC ........................................ 188/265; 188/73.1

(58) Field of Classification Search
USPC .................. 188/31, 69, 265, 72.9, 73.1, 166; 303/89; 192/219.5
See application file for complete search history.

(56) References Cited

U.S. PATENT DOCUMENTS

| | | | | |
|---|---|---|---|---|
| 2,330,201 A * | 9/1943 | Boynton | | 81/179 |
| 2,706,020 A * | 4/1955 | Freers et al. | | 188/357 |
| 4,109,763 A * | 8/1978 | Sugino | | 188/32 |
| 4,310,081 A * | 1/1982 | Kolacz | | 192/219.5 |
| 4,610,336 A * | 9/1986 | Kuwayama et al. | | 192/219.5 |
| 4,610,337 A | 9/1986 | Kuwayama et al. | | |
| 4,934,490 A * | 6/1990 | Chang | | 188/31 |
| 6,467,600 B2 * | 10/2002 | Lee | | 192/219.5 |
| 6,508,341 B1 * | 1/2003 | Hiura | | 188/265 |
| 7,448,296 B2 * | 11/2008 | Fukase | | 74/516 |
| 2001/0042669 A1 * | 11/2001 | Arakawa | | 192/219.5 |
| 2005/0258683 A1 * | 11/2005 | Yamaguchi | | 303/89 |

FOREIGN PATENT DOCUMENTS

| | | |
|---|---|---|
| DE | 19535239 | 12/1996 |
| DE | 19818752 | 11/1998 |
| DE | 10316949 | 11/2004 |
| WO | WO2007017004 | 2/2007 |

* cited by examiner

*Primary Examiner* — Melody Burch
(74) *Attorney, Agent, or Firm* — Sue C. Watson; Patrick Sheldrake

(57) ABSTRACT

An apparatus for the parking lock of a vehicle, in particular, of an agricultural tractor. The apparatus comprises a parking lever mechanically linked to a braking lever by a cinematic chain. The braking lever comprises a tooth apt to engage at least a braking element vehicle. The braking lever is provided with a yielding device placed in correspondence to its own hinge. The yielding device is able to ease the engagement of the tooth with a gap comprised between two teeth of a driveline gear in order to guarantee a reliable parking lock of the vehicle.

10 Claims, 4 Drawing Sheets

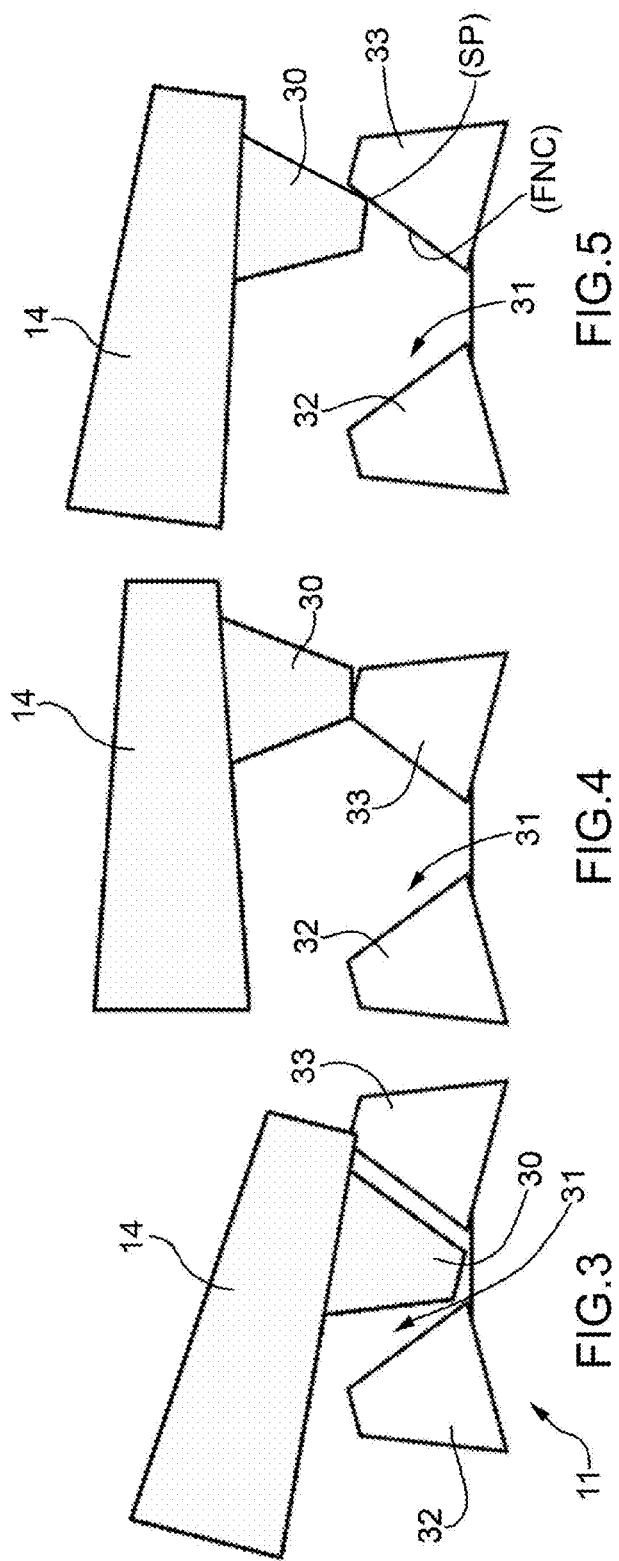

APPARATUS FOR THE PARKING LOCK OF AN AGRICULTURAL VEHICLE

The present invention concerns an apparatus for the parking lock of a vehicle, in particular of an agricultural tractor. In particular, the present invention is advantageously, but not exclusively, employed in the field of agricultural tractors, to which the following description will explicitly refer without losing its general meaning.

As already known, in the field of agricultural tractors apparatuses for parking lock are used which comprise a parking lever mechanically linked to a working lever by means of a cinematic chain. Furthermore, the working lever comprises a tooth which engages a braking element of the vehicle, said element being formed, in most cases, by a driveline gear fitting on the shaft of the conic pinion which brings motion to the differential box.

One of the disadvantages remarked in the use of said apparatuses is represented by the fact that, when the vehicle is loaded, if the tooth of the working lever does not exactly engage one of the gaps placed between two teeth of the braking driveline gear, a sudden turning of said braking driveline gear could occur, which on its turn could cause the breaking of at least one of the two teeth, thus removing the parking lock.

Therefore, if the tractor with trailer is parked on a slope, the sudden breaking of one of the two teeth (or even both of them) evidently involves the brake release.

It is clear that all the aforesaid can have disastrous consequences when the vehicle, no longer locked and on a slope, starts moving downwards out of the driver's control.

Therefore, the aim of the present invention is creating an apparatus of the parking lock of a vehicle which is free from the aforesaid disadvantages and which can at the same time be easily and economically produced.

BRIEF DESCRIPTION OF THE DRAWINGS

The present invention will be described hereinafter with a reference to the enclosed drawings, wherein:

FIG. 3 shows a first status of engagement between two elements belonging to the apparatus of FIG. 1;

FIG. 4 shows a second status of engagement between two elements belonging to the apparatus of FIG. 1;

FIG. 5 shows a third status of engagement between two elements belonging to the apparatus of FIG. 1.

DETAILED DESCRIPTION OF THE INVENTION

Figure 1:
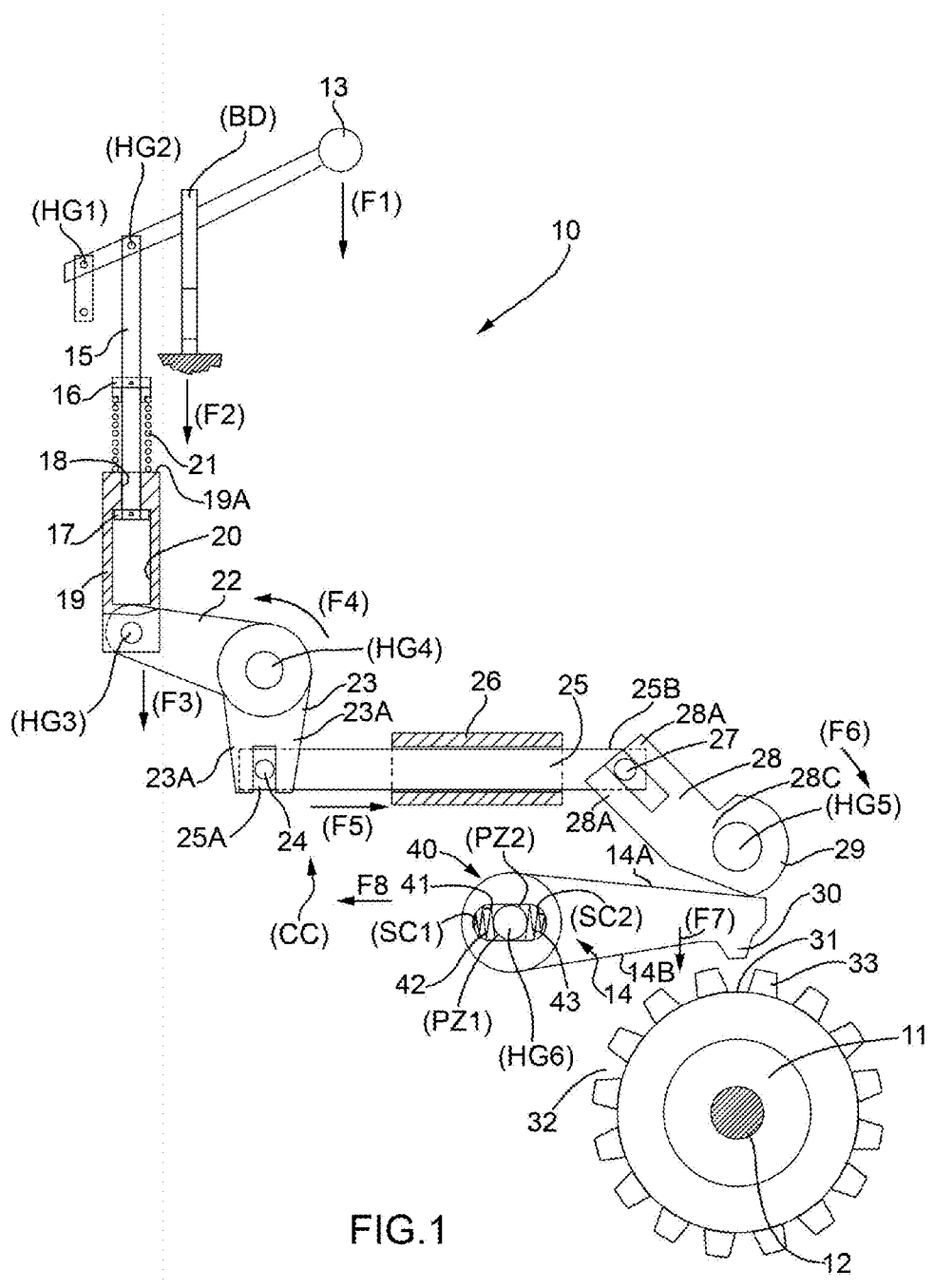
FIG. 1 shows a general lay-out of an apparatus for the parking lock according to a first embodiment of the yielding device of the present invention.

In FIG. 1 the reference number 10 globally indicates an apparatus for a parking lock which in particular can be suitably applied to an agricultural tractor.

The apparatus 10, as it will be better understood hereinafter, acts on a driveline gear 11 fitted on a shaft 12 which, on its free end, also supports a conic pinion (not shown) bringing motion to the differential housing (not shown).

Moreover, the apparatus 10 comprises a parking lever 13 for the manual insertion of the locking function of the driveline gear 11, and therefore of the whole vehicle. The parking lever 13 is mechanically linked to a braking lever which, as it will be seen, directly acts on the driveline gear 11 by means of a cinematic chain (CC) whose components will be described hereinafter.

The parking lever 13 is hinged to the vehicle frame by means of a hinge (HG1) and is provided with a blocking device (BD) of the position of said parking lever 13 once it has been pushed downwards by the driver of the vehicle.

Figure 2:
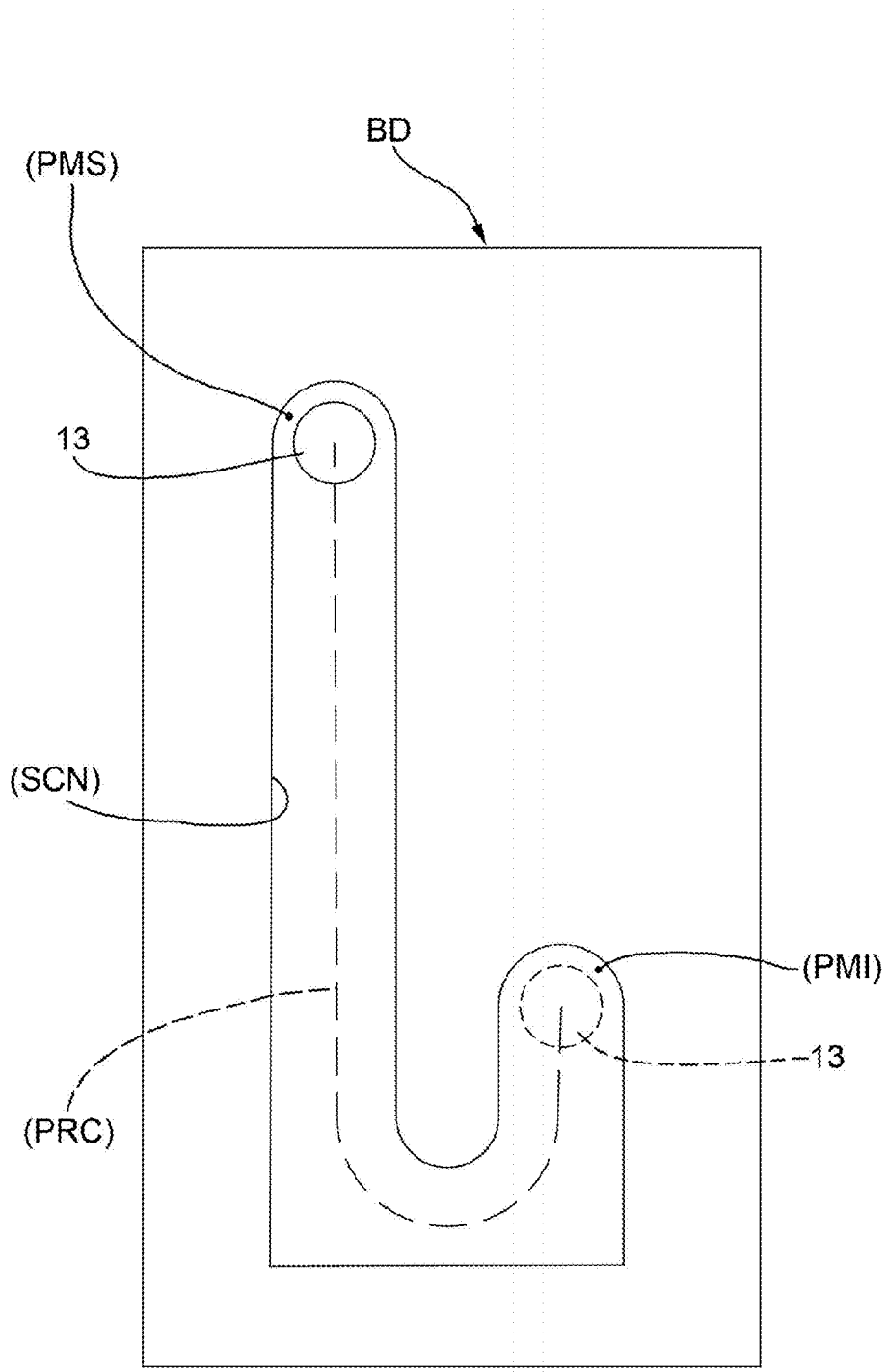
FIG. 2 shows an enlarged view of a detail of the apparatus of FIG. 1.

As shown in more detail in FIG. 2, the device (BD) comprises a groove (SCN) which, on its turn, is provided with an upper dead point (PMS), wherein the parking lever 13 is placed when the vehicle is in motion, and with a lower dead point (PMI) wherein said parking lever 13 is housed if the driver inserts the locking function of the vehicle. In the groove (SNC) a path (PRC) is defined between the upper dead point (PMS) and the lower dead point (PMI) which is followed by the parking lever 13 when the driver wants to select the parking brake. It is clear that the parking lever 13 follows the path (PRC) in the opposite direction if the parking brake is removed by the driver. In this case the driver must push downwards the parking lever 13 so that it is freed from the lower dead point (PMI) and then said parking lever 13 is raised upwards till the upper dead point (PMS).

The cinematic chain (CC) comprises a bar 15 hinged to the parking lever 13 by means of a hinge (HG2).

Two plates 16, 17 are fixed to the bar 15. Furthermore, the bar 15 crosses a through hole 18 made on a cylinder 19, also provided with a central room 20. As shown in FIG. 1, the through hole 18 connects the central room 20 to the outside.

The plate 16 is placed outside the central room 20, whereas the plate 17 is housed in the central room 20 and leads the cylinder 19. Moreover, a helical spring 21 is placed between the plate 16 and a side 19A of cylinder 19, said spring being compressed when the parking lever 13 is pushed downwards by the operator according to a direction given by an arrow (F1) (FIG. 1). Obviously, the compression of the helical spring 21 causes a downward movement of the cylinder 19.

A connecting rod 22 is hinged to the cylinder 19 by means of a hinge (HG3). A fork 23 is fixed to the connecting rod 22. Both the connecting rod 22 and the fork 23, integral to each other, are hinged to the frame by means of a hinge (HG4).

As shown in FIG. 1, a first latch 24 is placed between the prongs 23A of the fork 23 which, on its turn, is integral to a first end 25A of an intermediate lever 25 apt to horizontally slide in a guide 26.

A second latch 27 is placed in correspondence to a second end 25B of the intermediate lever 25, said latch 27 being housed in use in the gap between the prongs 28A placed on the first end 28B of a transmission element 28.

A second end 28C of the transmission element 28 is provided with a suitably shaped cam 29. Furthermore, the transmission element 28 is hinged to the frame by means of a hinge (HG5).

The cam 29 relies on an upper surface 14A of the working lever 14 which is hinged to the frame by means of a hinge (HG6).

A tooth 30 is placed on a lower surface 14B of the braking lever 14 and in correspondence to its free end, said tooth being able to engage, in use, a gap 31 comprised between two teeth 32, 33 of the driveline gear 11 (see hereinafter).

A correct insertion of the tooth 30 in the gap 31 allows to lock the driveline gear 11, the shaft 12 and therefore the whole vehicle.

In actual use, if the driver pushes downwards the parking lever 13 according to the arrow (F1), this causes a lowering of the bar 15 and of the cylinder 19 following directions respectively indicated by an arrow (F2) and by an arrow (F3). The bar 15 glides in the through hole 18, whereas the cylinder 19 glides on the plate 17 in the room 20.

The turning of the connecting rod 22 and of the fork 23, integral to each other, around the hinge (HG4) (following the direction given by an arrow (F4)) causes a translation of the latch 24, and therefore of the intermediate lever 25, following the direction indicated by an arrow (F5).

On its turn, the latch 27, engaged in the gap between the two prongs 28A, causes a turning (following a direction given by an arrow (F6)) of the transmission element 28 around the hinge (HG5).

In this way it is obtained a rolling of cam 29 on the upper surface 14A of the braking lever 14. Therefore, the braking lever 14 lowers itself following a direction indicated by an arrow (F7).

In an ideal working situation of the apparatus 10, said lowering of the working lever 14 and of the tooth 30 involves, as previously said, the insertion of said tooth in the gap comprised between two teeth 32, 33 of the driveline gear 11 (FIG. 3) and the steady braking of this latter. As previously stated, a steady braking of the driveline gear 11 involves a steady braking of the shaft 12 of the differential conic pinion and therefore of the whole vehicle.

However, during the parking step, the ideal situation shown in FIG. 3 does not always occur.

In fact, it is often given one of the two situations shown in FIGS. 4 and 5.

In the situation shown in FIG. 4, after the braking, the tooth 30 of the braking lever 14 is placed exactly above the ridge of the tooth 33 of the driveline gear 11.

In this case the driver has lowered the parking lever 13 from the upper dead point (PMS) to the lower dead point (PMI) for braking the vehicle, without causing particular drawbacks. Therefore, since the parking lever 13 is now in the lower dead point (PMI), the driver assumes that the vehicle is correctly locked.

This is not correct, since the tooth 30 rests on the ridge of the tooth 33 and does not block the system. However, as soon as the vehicle, for instance a tractor with a trailer, is loaded, a small turning of the driveline gear 11 can occur due to the impact of the load in the trailer, which causes the tooth 30 to reach the gap 31, thus recreating the condition shown in FIG. 3. In this way an accidental correct parking lock of the vehicle is obtained.

A more critical situation is certainly the one shown in FIG. 5, wherein an edge (SP) of the tooth 30 is blocked on an external portion of a side (FNC) of the tooth 33.

In this case, if the trailer is loaded, the sudden impact of the load in the trailer will cause a sudden turning of the driveline gear 11 which can cause the breaking of at least one of the two teeth 30, 33, thus disengaging the parking lock. Therefore, if the tractor with a trailer is parked on a slope, the sudden breaking of one of the two teeth 30, 33 (or even of both of them) evidently involves the release of the lock, thus no longer blocking the driveline gear 11, the shaft 12 and therefore the whole vehicle.

It is clear that this can have disastrous consequences when the vehicle, non longer locked and on a slope, starts moving out of the driver's control.

Therefore, in order to solve this problem, it has been thought to apply an innovative yielding device 40 to the breaking lever 14 in correspondence to its own hinge (HG6).

In its simplest embodiment, said yielding device 40 comprises a hole 41 wherein the hinge (HG6) is inserted together with two helical springs 42, 43.

The helical spring 42 is comprised between a first portion (PZ1) of the surface of the hinge (HG6) and a first portion (SC1) of the surface of the hole 41. Analogously, the helical spring 43 is placed in the gap between a second portion (PZ2) of the surface of the hinge (HG6) and a second portion (SC2) of the surface of the hole 41. Of course, the use of two springs is not a necessity, one single spring located between a portion (PZ1 or PZ2) of the surface of the hinge (HG6) and a portion (SC1 or SC2) of the surface of the hole 41 suffices to accomplish the same effect.

In use, if the tooth 30 were in one of the two situations shown in FIG. 4 or 5, a movement of the braking lever 14 in the direction given by arrow (F8) is possible.

The contact force existing between teeth 30 and 33 is then transmitted on the braking lever 14, and thus on the helical springs 42, 43 which consequently yield.

Another case occurs when a turning of the driveline gear 11, even very small, takes place, thanks to the yielding of the connection, the braking lever 14 slightly moves following a direction given by an arrow (F8) so that the tooth 30 exactly engages the gap 31 between the two teeth 32, 33.

Figure 6:
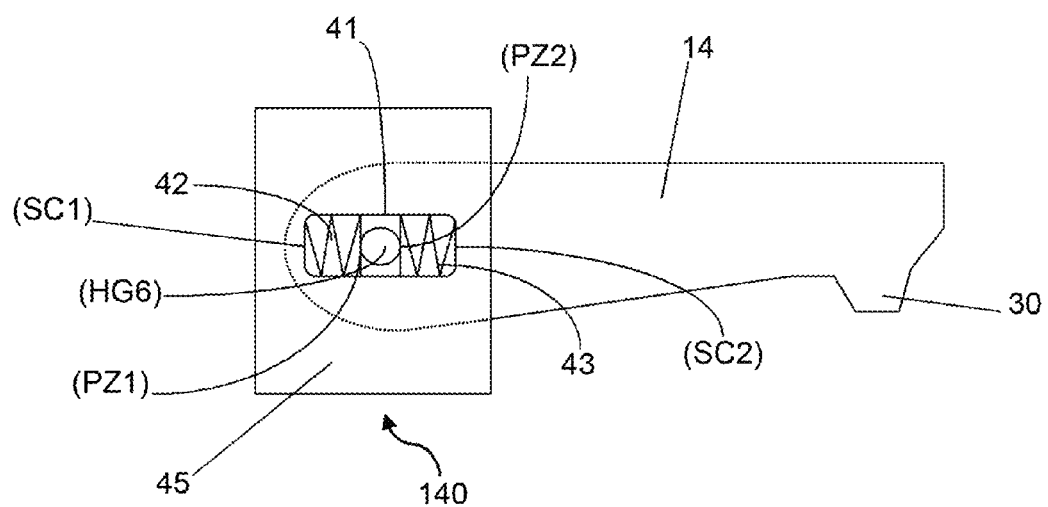
FIG. 6 shows a second embodiment of the yielding device of FIG. 1.

In a second embodiment of the present invention as shown in FIG. 6, the yielding device 40 is replaced by an alternative yielding device 140. The yielding device 140 comprises a plate 45 having a hole 41 wherein the hinge (HG6) is inserted. Two helical springs 42 and 43 position the hinge (HG6) inside the hole 41. The plate 45 of the yielding device 140 is connected to the frame of the vehicle, while the hinge (HG6) is connected to the braking lever 14. When the tooth 30 is not aligned correctly with the gap 31 (HG6), the hinge, and thus the braking lever 14 with the tooth 30, will be able to move backward or forward thanks to the springs 42 and 43 inside the hole 41 of the plate 45 of the yielding device 40. Again, only one spring located in the hole 41 of the plate 45 suffices to accomplish the same effect.

The main advantage of the above described apparatuses for the aforesaid parking lock consist in a remarkable improvement of the lock steadiness as well as of the security with regard to possible involuntary movements of the vehicle due to its loading. Even if the driveline gear turns a bit, the tooth 30 and thus the working lever 14 will be able to move against the force of the springs 42, 43 inside the hole 41, such that the forces on the tooth 30 when contacting the sides of teeth 32 or 33 do not rise above the point that the tooth 30 can break. Additionally, a correct alignment of the tooth 30 in the hole 31 is possible and no longer depends of an accidental movement of the driveline gear 11.

What is claimed is:

1. An apparatus for a parking lock of a vehicle, the apparatus comprising:
   a parking lever;
   a cinematic chain coupled to the parking lever, the cinematic chain including a transmission element, the transmission element having a first end and a second end and the transmission element extending therebetween, the second end forming a cam;
   a braking mechanism mechanically linked to the parking lever by the cinematic chain, the braking mechanism directly coupled to a hinge element, the braking mechanism defining an upper surface and having a locking element, the locking element configured for movement in a first direction towards and into engagement with a corresponding notch in at least one vehicle component that is cinematically or hydraulically linked to wheels or tracks of the vehicle, the locking element being moved in the first direction when the cam contacts the upper surface as the transmission element is rotated; and
   a yielding device including a separate plate defining a hole configured to receive the hinge element, the yielding device further including an elastic means received within the hole and positioned between the plate and the hinge element, the yielding device configured such that the braking mechanism and the hinge element are movable together with respect to the plate and the notch in a second direction substantially transverse to the first direction of the braking mechanism such that the locking element is movable transversely during engagement in order to aid alignment of the notch and locking element.

2. An apparatus according to claim 1, wherein the elastic means comprise a first spring placed between a first portion of a surface of the hinge element and a first portion of a surface of the hole.

3. An apparatus according to claim 2, wherein the elastic means further comprise a second spring placed between a second portion of the surface of the hinge element and a second portion of the surface of the hole.

4. An apparatus according to claim 1, wherein said hinge element is non-rotatably coupled to the braking mechanism.

5. An apparatus according to claim 1, further comprising a blocking device defining a groove configured to receive a portion of the parking lever, the parking lever being movable within the groove between an upper dead point and a lower dead point.

6. An apparatus according to claim 1, wherein the cinematic chain comprises a bar hingedly coupled to the parking lever and a cylinder configured to receive a portion of the bar.

7. An apparatus according to claim 6, wherein the bar includes a first plate disposed outside the cylinder and a second plate disposed within the cylinder, wherein the cinematic chain further includes a spring coupled between the first plate and the cylinder.

8. An apparatus according to claim 6, wherein the cinematic chain further comprises a connecting rod hingedly coupled to the cylinder and a fork hingedly coupled to the connecting rod.

9. An apparatus according to claim 8, wherein the cinematic chain further comprises a guide and an intermediate lever slidably received within the guide, the intermediate lever having a first end and a second end, and the intermediate lever extending therebetween.

10. An apparatus according to claim 9, wherein a first latch is positioned at the first end of the intermediate lever and a second latch is positioned at the second end of the intermediate lever, the first latch being received between a pair of prongs defined by the fork, the second latch being received between a pair of prongs defined in the first end of the transmission element.

* * * * *